US011629585B2

United States Patent
Han et al.

(10) Patent No.: US 11,629,585 B2
(45) Date of Patent: Apr. 18, 2023

(54) INTEGRATED COAXIAL PERFORATING ACIDIZING OPERATION

(71) Applicant: Hunting Titan, Inc., Pampa, TX (US)

(72) Inventors: Chenghua Han, Sugar Land, TX (US); Ryan Rowell, Richmond, TX (US); Scott Thiessen, Houston, TX (US); Joseph Hitt, Thornton, CO (US)

(73) Assignee: Hunting Titan, Inc., Pampa, TX (US)

( * ) Notice: Subject to any disclaimer, the term of this patent is extended or adjusted under 35 U.S.C. 154(b) by 0 days.

(21) Appl. No.: 17/421,696

(22) PCT Filed: Jan. 14, 2020

(86) PCT No.: PCT/US2020/013505
§ 371 (c)(1),
(2) Date: Jul. 8, 2021

(87) PCT Pub. No.: WO2020/150232
PCT Pub. Date: Jul. 23, 2020

(65) Prior Publication Data
US 2022/0090479 A1 Mar. 24, 2022

Related U.S. Application Data

(60) Provisional application No. 62/793,257, filed on Jan. 16, 2019.

(51) Int. Cl.
| | | |
|---|---|---|
| *E21B 43/27* | (2006.01) | |
| *C09K 8/70* | (2006.01) | |
| *C09K 8/72* | (2006.01) | |
| *E21B 43/116* | (2006.01) | |
| *E21B 43/117* | (2006.01) | |
| *E21B 43/263* | (2006.01) | |
| *F42B 1/02* | (2006.01) | |

(52) U.S. Cl.
CPC .............. *E21B 43/27* (2020.05); *C09K 8/706* (2013.01); *C09K 8/72* (2013.01); *E21B 43/116* (2013.01); *E21B 43/117* (2013.01); *E21B 43/263* (2013.01); *F42B 1/02* (2013.01)

(58) Field of Classification Search
CPC ......... C09K 8/706; C09K 8/72; E21B 43/263; E21B 43/117; E21B 43/116
See application file for complete search history.

(56) References Cited

U.S. PATENT DOCUMENTS

| | | |
|---|---|---|
| 3,188,955 A | 6/1965 | Brown |
| 9,441,438 B2 * | 9/2016 | Allison ................. E21B 43/119 |
| 9,835,014 B2 | 12/2017 | Dai |

(Continued)

FOREIGN PATENT DOCUMENTS

| | | | |
|---|---|---|---|
| CN | 1147054 A | * | 4/1997 |
| CN | 104169521 A | | 4/2013 |

(Continued)

OTHER PUBLICATIONS

Notification of transmittal of the International Search Report and the Written Opinion of the International Searching Authority, or the Declaration, dated Apr. 24, 2020, PCT/US20/13505, 11 pages.

*Primary Examiner* — Silvana C Runyan (57) ABSTRACT

A method and apparatus for acidizing and perforating simultaneously.

20 Claims, 6 Drawing Sheets

(56) References Cited

U.S. PATENT DOCUMENTS

| | | | |
|---|---|---|---|
| 2003/0019627 A1* | 1/2003 | Qu | E21B 43/26 |
| | | | 166/308.2 |
| 2005/0056459 A1 | 3/2005 | Haney et al. | |
| 2008/0282924 A1 | 11/2008 | Saenger et al. | |
| 2011/0094406 A1* | 4/2011 | Marya | E21B 29/02 |
| | | | 102/305 |
| 2011/0146519 A1* | 6/2011 | Han | F42B 1/02 |
| | | | 86/1.1 |
| 2013/0112411 A1 | 5/2013 | Shi et al. | |
| 2013/0180701 A1 | 7/2013 | Clay et al. | |
| 2014/0151046 A1 | 6/2014 | Marya et al. | |
| 2016/0186536 A1 | 6/2016 | Dai | |
| 2017/0175500 A1 | 6/2017 | Robey et al. | |
| 2017/0234116 A1 | 8/2017 | Gilliat et al. | |
| 2018/0079696 A1* | 3/2018 | Skyler | F42B 1/032 |

FOREIGN PATENT DOCUMENTS

| | | |
|---|---|---|
| CN | 206903646 U | 1/2018 |
| WO | 2014172910 A1 | 10/2014 |

\* cited by examiner

INTEGRATED COAXIAL PERFORATING ACIDIZING OPERATION

RELATED APPLICATIONS

This application claims priority to U.S. Provisional Application No. 62/793,257, filed Jan. 16, 2019.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically, a wellbore will be drilled from a surface location, placing a hole into a formation of interest. Completion equipment will be put into place, including casing, tubing, and other downhole equipment as needed. Perforating the casing and the formation with a perforating gun is a well-known method in the art for accessing hydrocarbon deposits within a formation from a wellbore.

Explosively perforating the formation using a shaped charge is a widely known method for completing an oil well. A shaped charge is a term of art for a device that when detonated generates a focused output, high energy output, and/or high velocity jet. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates, the liner metal is compressed into a super pressurized jet that can penetrate metal, concrete, and rock. Perforating charges are typically used in groups. These groups of perforating charges are typically held together in an assembly called a perforating gun. Perforating guns come in many styles, such as strip guns, capsule guns, port plug guns, and expendable hollow carrier guns.

Perforating charges are typically detonated by detonating cord in proximity to a priming hole at the apex of each charge case. Typically, the detonating cord terminates proximate to the ends of the perforating gun. In this arrangement, an initiator at one end of the perforating gun can detonate all of the perforating charges in the gun and continue a ballistic transfer to the opposite end of the gun. In this fashion, numerous perforating guns can be connected end to end with a single initiator detonating all of them.

The detonating cord is typically detonated by an initiator triggered by a firing head. The firing head can be actuated in many ways, including but not limited to electronically, hydraulically, and mechanically.

Expendable hollow carrier perforating guns are typically manufactured from standard sizes of steel pipe with a box end having internal/female threads at each end. Pin ended adapters, or subs, having male/external threads are threaded one or both ends of the gun. These subs can connect perforating guns together, connect perforating guns to other tools such as setting tools and collar locators, and connect firing heads to perforating guns. Subs often house electronic, mechanical, or ballistic components used to activate or otherwise control perforating guns and other components.

Perforating guns typically have a cylindrical gun body and a charge tube, or loading tube that holds the perforating charges. The gun body typically is composed of metal and is cylindrical in shape. Charge tubes can be formed as tubes, strips, or chains. The charge tubes will contain cutouts called charge holes to house the shaped charges.

It is generally preferable to reduce the total length of any tools to be introduced into a wellbore. Among other potential benefits, reduced tool length reduces the length of the lubricator necessary to introduce the tools into a wellbore under pressure. Additionally, reduced tool length is also desirable to accommodate turns in a highly deviated or horizontal well. It is also generally preferable to reduce the tool assembly that must be performed at the well site because the well site is often a harsh environment with numerous distractions and demands on the workers on site.

Electric initiators are commonly used in the oil and gas industry for initiating different energetic devices down hole. Most commonly, 50-ohm resistor initiators are used. Other initiators and electronic switch configurations are common.

SUMMARY OF EXAMPLE EMBODIMENTS

An example embodiment may include an acidizing shaped charge having a charge case with a hollow portion, a detonation end, and a detonator end, an explosive material disposed within the hollow portion of the charge case, a liner disposed within the explosive material, a charge cap attached to the detonation end of the charge case containing an acidizing material, wherein the acidizing material is linearly located with and carried into a wellbore formation with the explosive jet created by the detonation of the explosive material against the liner.

An alternative embodiment may include the charge cap including hydrofluoric acid. The charge cap may include hydrochloric acid. The charge cap may include a mixture of hydrofluoric acid and hydrochloric acid. The charge cap may include a dome shaped tapped jet passage adjacent to the detonation end of the charge case. The charge cap may have a dome shaped cap front facing the direction of the explosive jet. The charge cap may include at least 3.5 percent hydrofluoric acid. The charge cap may include at least 3.5 percent hydrochloric acid. The charge cap may include at least 7.5 percent hydrochloric acid and at least 1.5 percent hydrofluoric acid. The charge cap may include at least 12 percent hydrochloric acid and at least 3 percent hydrofluoric acid. The charge cap may include hydrofluoric acid in a concentration between 0.5 and 10 percent. The charge cap may include hydrochloric acid in a concentration between 1.5 and 36 percent.

An example embodiment may include an acidizing shaped charge having a charge case with a hollow portion, a detonation end, and a detonator end, an explosive material disposed within the hollow portion of the charge case, a liner disposed within the explosive material, a charge cap attached to the detonation end of the charge case, having a thru hole that is linearly aligned with the output of the shaped charge, and containing an acidizing material, wherein the acidizing material is linearly located with and carried into a wellbore formation with the explosive jet created by the detonation of the explosive material against the liner.

An example embodiment may include a method for acidizing a downhole formation including lowering a perforating gun to a first location within a wellbore, detonating the perforating gun at the first location within the wellbore, injecting a perforating jet into the downhole formation at the first location, and injecting acid material into the wellbore formation simultaneously with the perforating jet.

An alternative embodiment may include the acid material containing hydrofluoric acid or hydrochloric acid. It may include a mixture of hydrofluoric acid and hydrochloric acid. It may include at least 3.5 percent hydrofluoric acid or at least 3.5 percent hydrochloric acid. It may include at least 7.5 percent hydrochloric acid and at least 1.5 percent hydrofluoric acid. It may include at least 12 percent hydrochloric acid and at least 3 percent hydrofluoric acid. The charge cap may include hydrofluoric acid in a concentration between 0.5 and 10 percent. It may include hydrochloric acid in a concentration between 1.5 and 36 percent.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
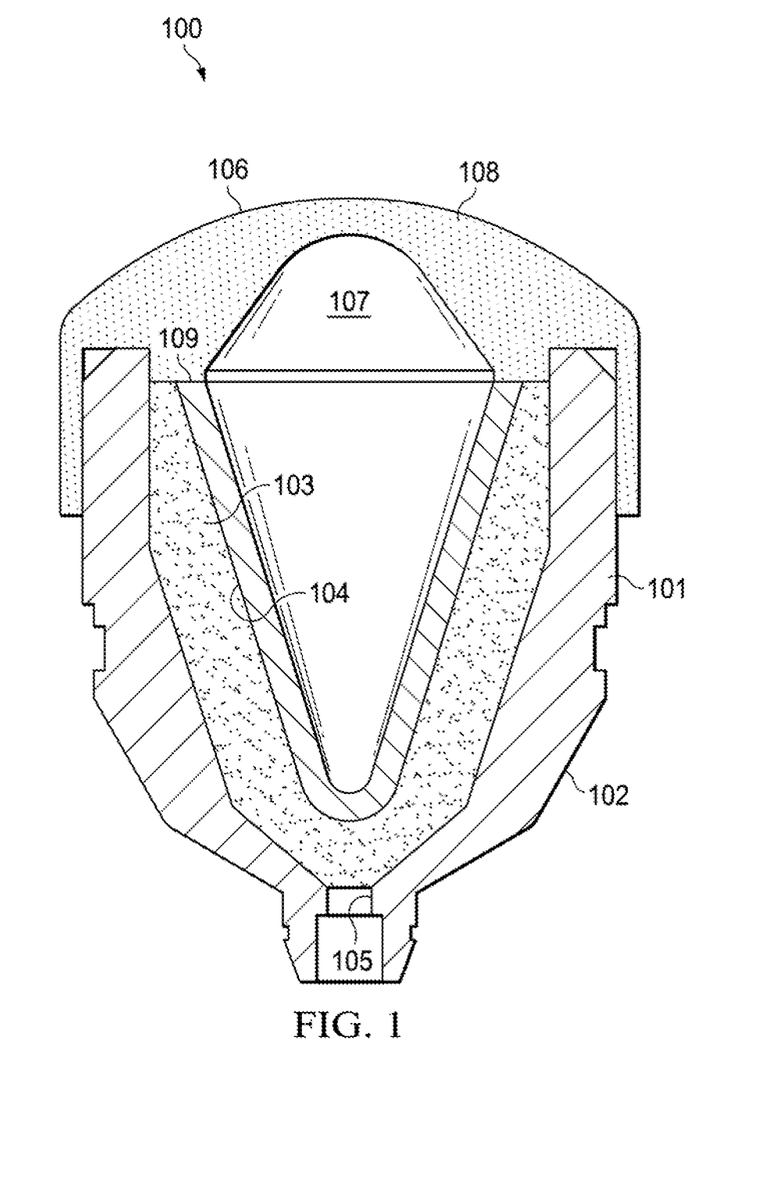
FIG. 1 shows a shaped charge with an acid containing charge cap.

An example embodiment is shown in FIG. 1 of an acidizing shaped charge assembly 100. It includes a shaped charge 101, that is composed of a charge case 102. Explosive material 103 is pressed within the cavity of charge case 102. A charge liner 104 is formed into a frustro-conical shape and pressed into the explosive material 103. A charge liner 104 is typically composed of a powdered metallic compound pressed into shape. In this example a charge cap 108 is attached to the output end 109 of the shaped charge 101. The charge cap 108 may be composed of an acidizing material, such as hydrofluoric acid or hydrochloric acid. The acid material may be in a solid form as depicted, or it may be in a liquid form stored in a hollow portion of charge cap 108. The charge cap includes a jet passage 107, which in this example is a dome shaped impression within the charge cap that collects the explosive jet created from detonating shaped charge 101. The jet passage 107 may be tapped. The cap front 106 is curved and faces the direction of the explosive jet exiting the shaped charge 101. Primer column 105 is a hole in the bottom of the charge case 102, it allows the detonation of a detonating cord coupled to the bottom of the charge case 102 to ignite the explosive material 103 within the charge case 102. The acid material is placed linearly with the jet direction of the shaped charge 101. The acid material contained within the charge cap 108 may be installed at the wellsite or preinstalled.

The detonation of the shaped charge 101 results in acid spearheading in the resulting perforated tunnel within the wellbore. The metallic jet created by the shaped charge 101 will perforate through the casing and wellbore formation, forming a perforated tunnel. The tail jet and the shock wave will carry the acid material from the charge cap 108 into the perforated tunnel. The high pressure and temperature of the explosive jet and the explosion event itself will vaporize the acid material of the charge cap 108, carry the vaporized acid material along with the explosive jet, thereby introducing the acid material into the perforated tunnel, and thus resulting in a fast and effective acidizing process in the formation rock. The acidizing process creates a clean and impairment free passage tunnel from the wellbore through the depth of penetration.

Figure 2:
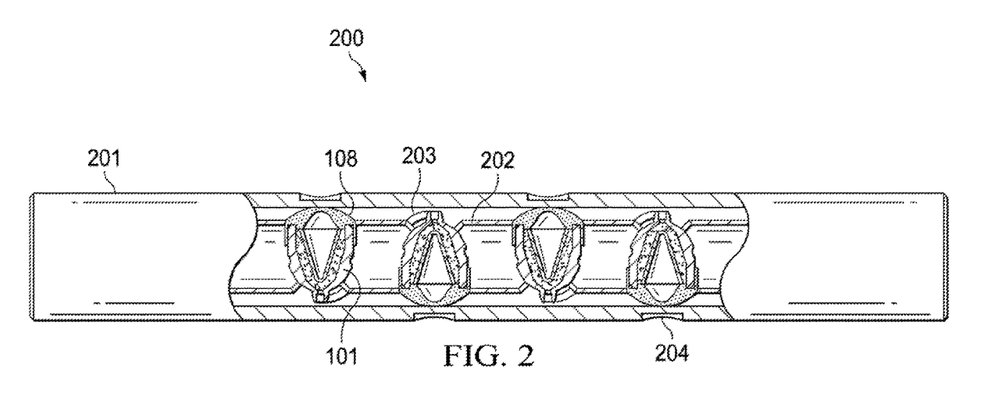
FIG. 2 shows a perforating gun containing a plurality of shaped charges, each having an acid containing charge cap.

An example embodiment is shown in FIG. 2 includes a perforating gun assembly 200. It includes a gun body 201 with scallops 204 and has a charge tube 202 disposed therein. Shaped charges 101 are disposed within the charge tube 202. Shaped charges 101 include charge caps 108, that may include an acidizing material as described herein. A detonating cord 203 is coupled to the shaped charges 101 in this example.

Figure 3A:
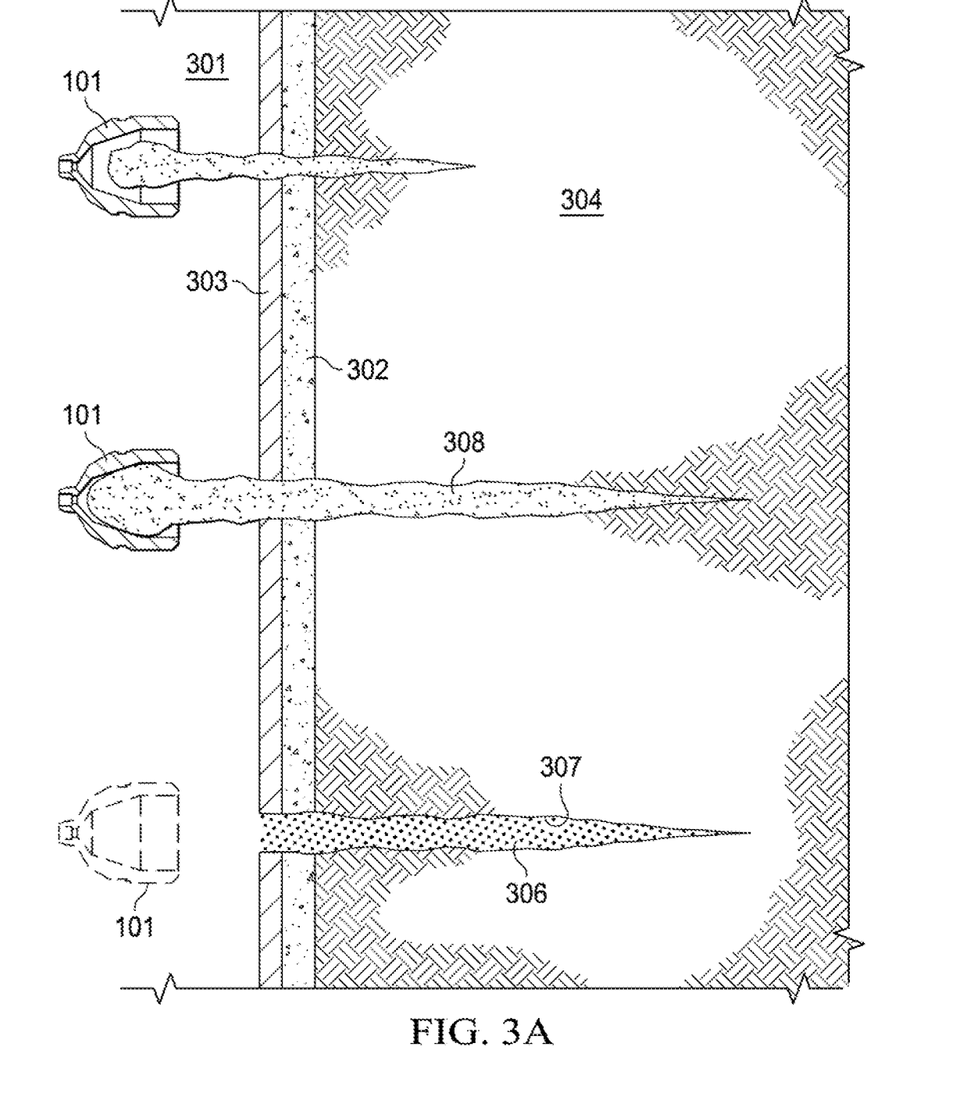
FIG. 3A shows a conventional perforating process with just a shaped charge.
Figure 3B:
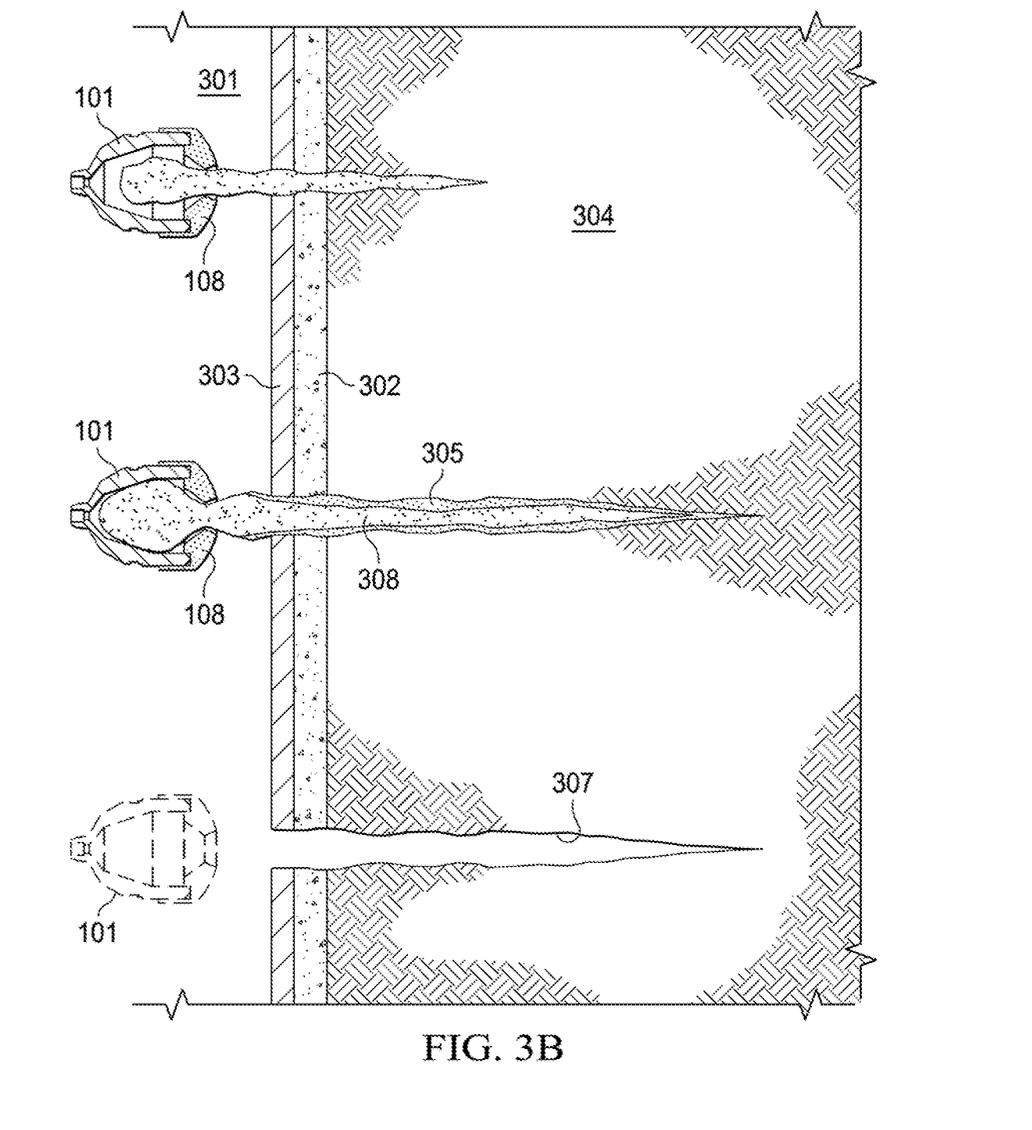
FIG. 3B shows a perforating process including a shaped charge with an acid containing charge cap.

The operation is illustrated in FIGS. 3A and 3B. In FIG. 3A a perforating gun is disposed in a wellbore 301 with a shaped charge 101. The detonation of the shaped charge 101 results in a perforating jet 308 that penetrates the casing 303, the cement 302, and a certain depth into the formation 304. The resulting perforating tunnel 307 includes debris 306. In FIG. 3B the shaped charge 101 includes a charge cap 108 with an acid material. The detonation creates a hot acid vapor 305 that travels with the perforating jet 308. The resulting perforating tunnel 307 contains less debris as a result of the acidizing effect of the hot acid vapor 305. Generally, the shaped charge 101 and the charge cap 108 will be destroyed by the detonation.

Figure 4:
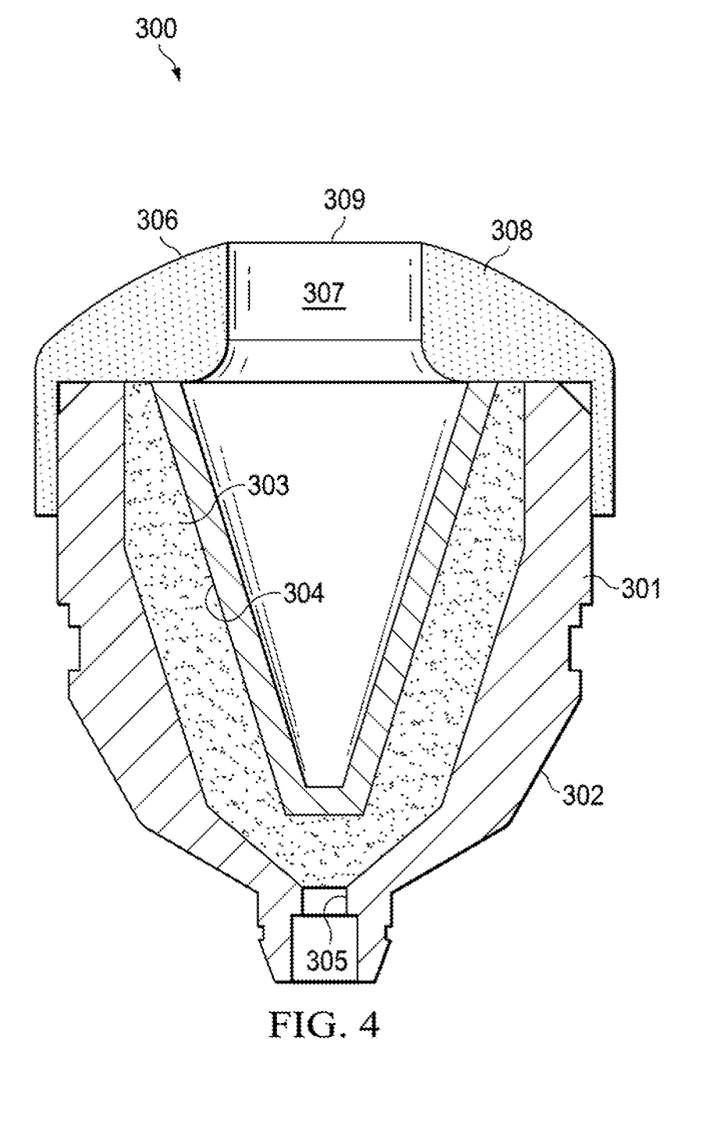
FIG. 4 shows a shaped charge with an acid containing charge cap with an opening.

An example embodiment is shown in FIG. 4 of an acidizing shaped charge assembly 300. It includes a shaped charge 301 that is composed of a charge case 302. Explosive material 303 is pressed within the cavity of charge case 302. A charge liner 304 is formed into a frustro-conical shape and pressed into the explosive material 303. A charge liner 304 is typically composed of a powdered metallic compound pressed into shape. In this example a charge cap 308 is attached to the output end 309 of the shaped charge 301. The charge cap 308 may be composed of an acidizing material, such as hydrofluoric acid or hydrochloric acid. The acid material may be in a solid form as depicted, or it may be in a liquid form stored in a hollow portion of charge cap 308. The charge cap includes a jet passage 307 with an exit hole 309, which in this example is thru passage traveling through the charge cap and is linearly aligned with the explosive output of the shaped charge 301. The jet passage 307 may be tapped or straight. The cap front 306 is curved and faces the direction of the explosive jet exiting the shaped charge 301. Primer column 305 is a hole in the bottom of the charge case 302, it allows the detonation of a detonating cord coupled to the bottom of the charge case 302 to ignite the explosive material 303 within the charge case 302. The acid material is placed linearly with the jet direction of the shaped charge 301. The acid material contained within the charge cap 308 may be installed at the wellsite or preinstalled.

The detonation of the shaped charge 301 results in acid spearheading in the resulting perforated tunnel within the wellbore. The metallic jet created by the shaped charge 301 will perforate through the casing and wellbore formation, forming a perforated tunnel. The tail jet and the shock wave will carry the acid material from the charge cap 308 into the perforated tunnel. The high pressure and temperature of the explosive jet and the explosion event itself will vaporize the acid material of the charge cap 308 as it transitions through the jet passage 307, carry the vaporized acid material along with the explosive jet, thereby introducing the acid material into the perforated tunnel, and thus resulting in a fast and effective acidizing process in the formation rock. The acidizing process creates a clean and impairment free passage tunnel from the wellbore through the depth of penetration.

Figure 5:
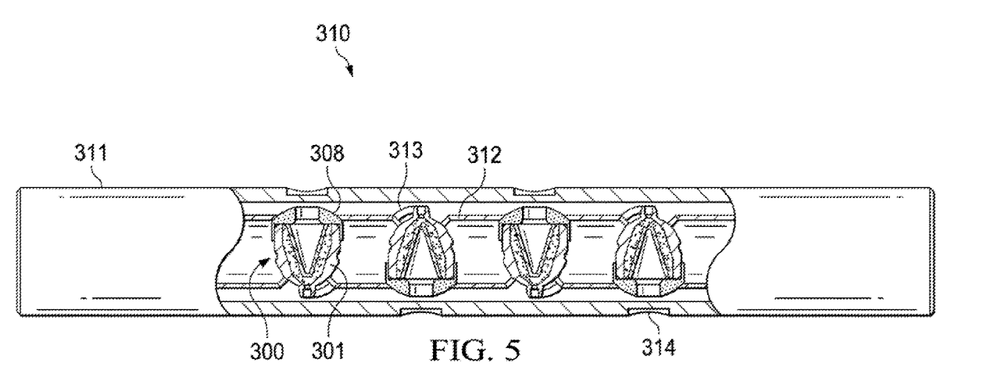
FIG. 5 shows a perforating gun containing a plurality of shaped charges, each having an acid containing charge cap.

An example embodiment is shown in FIG. 5 includes a perforating gun assembly 310. It includes a gun body 311 with scallops 314 and it has a charge tube 312 disposed therein. Shaped charge assemblies 300 include shaped charges 301 and charge caps 308 are disposed within the charge tube 312. Charge caps 308 may include an acidizing material as described herein. A detonating cord 313 is coupled to the shaped charges 301 in this example.

Acid material that can be used for this type of spearheading may include a mixture having hydrochloric acid in concentrations of 3.5 percent, 7.5 percent, 15 percent, or higher. It can include a mixture of hydrofluoric and hydrochloric acid of 7.5 percent HCl plus 1.5 percent HF, or 12 percent HCl plus 3 percent HF or higher. Acid material that can be used for this type of spearheading may include a mixture having hydrochloric acid in concentrations of 1.5 percent to 36 percent, or any concentration as required by the formation. Acid material that can be used for this type of spearheading may include a mixture having hydrofluoric acid in concentrations of 0.5 percent to 10 percent, or any concentration as required by the formation. Acid material that can be used for this type of spearheading may include a mixture having acetic acid in concentrations up to 75 percent. Acid material that can be used for this type of spearheading may include a mixture having formic acid in concentrations up to 85 percent.

Although the invention has been described in terms of embodiments which are set forth in detail, it should be understood that this is by illustration only and that the invention is not necessarily limited thereto. For example, terms such as upper and lower or top and bottom can be substituted with uphole and downhole, respectfully. Top and bottom could be left and right, respectively. Uphole and downhole could be shown in figures as left and right, respectively, or top and bottom, respectively. Generally downhole tools initially enter the borehole in a vertical orientation, but since some boreholes end up horizontal, the orientation of the tool may change. In that case downhole, lower, or bottom is generally a component in the tool string that enters the borehole before a component referred to as uphole, upper, or top, relatively speaking. The first housing and second housing may be top housing and bottom housing, respectfully. In a gun string such as described herein, the first gun may be the uphole gun or the downhole gun, same for the second gun, and the uphole or downhole references can be swapped as they are merely used to describe the location relationship of the various components. Terms like wellbore, borehole, well, bore, oil well, and other alternatives may be used synonymously. Terms like tool string, tool, perforating gun string, gun string, or downhole tools, and other alternatives may be used synonymously. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An acidizing shaped charge comprising:
   a hollow charge case with a detonation end, and a detonator end;
   an explosive material disposed within the charge case;
   a liner disposed within the explosive material; and
   an enclosed charge cap attached to the detonation end of the charge case containing an acidizing material in a hollow portion of the charge cap, wherein the acidizing material is aligned with and carried into a wellbore formation with the explosive jet created by the detonation of the explosive material against the liner
   wherein charge cap has a dome shaped cap front facing the direction of the explosive jet.

2. The acidizing shaped charge of claim 1 wherein charge cap includes hydrofluoric acid.

3. The acidizing shaped charge of claim 1 wherein charge cap includes hydrochloric acid.

4. The acidizing shaped charge of claim 1 wherein charge cap includes a mixture of hydrofluoric acid and hydrochloric acid.

5. The acidizing shaped charge of claim 1 wherein charge cap includes at least 3.5 percent hydrofluoric acid.

6. The acidizing shaped charge of claim 1 wherein charge cap includes at least 3.5 percent hydrochloric acid.

7. The acidizing shaped charge of claim 1 wherein charge cap includes at least 7.5 percent hydrochloric acid and at least 1.5 percent hydrofluoric acid.

8. The acidizing shaped charge of claim 1 wherein charge cap includes at least 12 percent hydrochloric acid and at least 3 percent hydrofluoric acid.

9. The acidizing shaped charge of claim 1 wherein charge cap includes hydrofluoric acid in a concentration between 0.5 and 10 percent.

10. The acidizing shaped charge of claim 1 wherein charge cap includes hydrochloric acid in a concentration between 1.5 and 36 percent.

11. A method for acidizing a downhole formation comprising:
    lowering a perforating gun including an acidizing shaped charge to a first location within a wellbore;
    detonating the perforating gun at the first location within the wellbore;
    injecting a perforating jet into the downhole formation at the first location; and
    injecting acid material into the wellbore formation with the perforating jet
    wherein the an acidizing shaped charge comprises a hollow charge case with a detonation end, and a detonator end, an explosive material disposed within the charge case, a liner disposed within the explosive material; and a fully enclosed charge cap attached to the detonation end of the charge case containing an acidizing material in a hollow portion, wherein the acidizing material is aligned with and carried into a wellbore formation with the explosive jet created by the detonation of the explosive material against the liner, and wherein charge cap has a dome shaped cap front facing the direction of the explosive jet.

12. The method for acidizing a downhole formation of claim 11 wherein the acid material contains hydrofluoric acid.

13. The method for acidizing a downhole formation of claim 11 wherein the acid material contains hydrochloric acid.

14. The method for acidizing a downhole formation of claim 11 wherein the acid material contains a mixture of hydrofluoric acid and hydrochloric acid.

15. The method for acidizing a downhole formation of claim 11 wherein the acid material includes at least 3.5 percent hydrofluoric acid.

16. The method for acidizing a downhole formation of claim 11 wherein the acid material includes at least 3.5 percent hydrochloric acid.

17. The method for acidizing a downhole formation of claim 11 wherein the acid material includes at least 7.5 percent hydrochloric acid and at least 1.5 percent hydrofluoric acid.

18. The method for acidizing a downhole formation of claim 11 wherein the acid material includes at least 12 percent hydrochloric acid and at least 3 percent hydrofluoric acid.

19. The method for acidizing a downhole formation of claim 11 wherein charge cap includes hydrofluoric acid in a concentration between 0.5 and 10 percent.

20. The method for acidizing a downhole formation of claim 11 wherein charge cap includes hydrochloric acid in a concentration between 1.5 and 36 percent.

* * * * *